United States Patent Office 2,922,814
Patented Jan. 26, 1960

2,922,814

METHOD FOR THE MANUFACTURE OF PHOSPHORODICHLORIDOTHIOATES

Henry Tolkmith, Midland, Mich., assignor to The Dow Chemical Company, Midland, Mich., a corporation of Delaware No Drawing. Application September 3, 1957
Serial No. 681,439

4 Claims. (Cl. 260—461)

This invention relates to a new and improved method for the manufacture of phosphorodichloridothioates having the formula

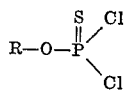

In this and succeeding formulas, R represents mono- and poly-chlorophenyl, mono- and poly-bromophenyl, 2-chloro-4-loweralkylphenyl and 2-bromo-4-loweralkylphenyl. The term "lower alkyl" refers to the alkyl radicals containing from 1 to 4 carbon atoms, inclusive. These compounds are valuable as intermediates for the preparation of a variety of more complex phosphorus derivatives such as the O-aryl O-alkyl phosphorochloridothioates, the O-aryl O-alkyl phosphoroamidothioates and the O-aryl O,O-dialkyl phosphorothioates. In such use, the O-aryl phosphorodichloridothioate intermediate is reacted with an alkali metal alcoholate to replace one or both chlorine atoms or is reacted successively with an alkali metal alcoholate and with ammonia to replace both chlorine atoms. The resulting compounds are useful as preservatives for paper, paint and wood and as parasiticides for the control of bacteria, fungi, mites and insects such as aphids, southern army worms and flies.

Several methods for preparing the O-halophenyl phosphorodichloridothioates are known. In one method, an O-halophenyl dichlorophosphite is reacted with an equimolar amount of phosphorus thiochloride whereby the sulfur of the PSCl₃ is added to the phosphorus atom of the dichlorophosphite to form an O-halophenyl phosphorodichloridothioate and phosphorus trichloride. This method of preparation gives low yields of the desired products.

It is an object of the present invention to provide an improved method for the production of O-halophenyl phosphorodichloridothioates and O-(2-halo-4-loweralkylphenyl) phosphorodichloridothioates. Another object is to provide a method which gives increased yields of these phosphorodichloridothioates. A further object is to provide a method of preparing O-halophenyl phosphorodichloridothioates and O-(2-halo-4-loweralkylphenyl) phosphorodichloridothioates which is more economical and results in greater yields than that obtained by known methods. Other objects will manifest themselves throughout the following specification and appended claims.

The new and improved method comprises reacting at a temperature of from 160° to 180° C. a phosphorodichloridite of the formula

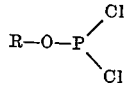

with sulfur in the presence of phosphorus trichloride and a substantial amount of the desired phosphorodichloridothioate to be prepared. The reaction is somewhat exothermic and takes place smoothly in the described temperature range with the production of the desired product in substantially quantitative yields and phosphorus thiochloride of reaction. The temperature may be controlled by regulating the rate of contacting the reactants. Upon completion of the reaction, the reaction mixture may be fractionally distilled under reduced pressure to separate the desired product as a viscous liquid or crystalline solid. This new process gives greater yields and higher purities of O-halophenyl phosphorodichloridothioates and O-(2-halo-4-loweralkylphenyl) phosphorodichloridothioates than have been previously obtainable by known methods.

To obtain the very desirable yields of the O-halophenyl phosphorodichloridothioates and O-(2-halo-4-loweralkylphenyl) phosphorodichloridothioates, it is critical and essential that the reaction be carried out in at least 0.1 molecular proportion of the desired reaction product for each molecular proportion of the employed phosphorodichloridite reactant. In a preferred method, from 0.5 to 1.5 molecular proportions of the desired product is employed with each molecular proportion of the phosphorodichloridite reactant. Smaller proportions materially reduce the yields of the desired phosphorodichlorodithioates whereas larger proportions are undesirable from the standpoint of economy.

It is also critical and essential in the practice of the present invention that the reaction be carried out in the temperature range of from 160° to 180° C. At temperatures substantially below 160° C., very little reaction takes place over prolonged contacting periods. Temperatures significantly in excess of the maximum temperature as above described materially reduce the yield of the desired product and should not be employed for any appreciable period of time.

The proportions of phosphorus trichloride and sulfur to be employed are also critical since only enough PCl₃ is employed to remove the excess sulfur. It is preferable to employ more than one gram atom of sulfur for each molecular proportion of phosphorodichloridite employed but less than one gram atom of sulfur for each molecular proportion of total phosphorodichloridite and phosphorus trichloride employed. Larger amounts of sulfur cause contamination of the desired product. The use of not more than 0.8 molecular proportion of phosphorus trichloride for each molecular proportion of phosphorodichloridite employed permits operation under atmospheric pressure. Larger amounts of phosphorus trichloride require operation under increased pressure in order to maintain the necessary reaction temperature of 160° to 180° C.

The rate at which the reaction takes place has been found to vary with the phosphorodichloridite employed as well as the temperature, the more highly substituted O-halophenyl phosphorodichloridites and lower reaction temperatures requiring longer reaction periods. In general, the reaction is complete in from 2 to 5 hours.

In carrying out the reaction, a mixture of the phosphorodichloridite and phosphorus trichloride is added portionwise with stirring to a mixture of the desired phosphorodichloridothioate (previously prepared) and sulfur. In an alternative method, sulfur is added portionwise wtih stirring to a mixture of the phosphorodichloridite, phosphorus trichloride and phosphorodichloridothioate. The addition is carried out over a period of about 2 hours and at a temperature of from 160° to 180° C. at atmospheric pressure. Upon completion of the reaction, the reaction mixture is fractionally distilled under reduced pressure to separate the desired phosphorodichloridothioate.

The following examples illustrate the invention but are not to be construed as limiting:

*Example 1.—O-(2,4,5-trichlorophenyl) phosphorodichloridothioate*

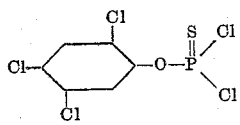

A mixture containing 298 grams (1.0 mole) of O-(2,4,5-trichlorophenyl) phosporodichloridite and 69 grams (0.5 mole) of phosphorus trichloride was added portionwise with stirring to a mixture containing 495 grams (1.5 moles) of O-(2,4,5-trichlorophenyl) phosphorodichloridothioate and 37.5 grams (1.2 atoms) of sulfur. The addition was carried out over a period of two hours and at a temperature of from 160° to 175° C. at atmospheric pressure. Stirring was thereafter continued at the same temperature and pressure for an additional two hours. Upon completion of the reaction, the reaction mixture was fractionally distilled under reduced pressure to obtain 816 grams of an O-(2,4,5-trichlorophenyl) phosphorodichloridothioate product boiling at 175° C. at 10 millimeters pressure. This amounts to the production of 321 grams of the desired phosphorodichloridothioate during the reaction which corresponds to a 99 percent yield based upon the O-(2,4,5-trichlorophenyl) phosphorodichloridite starting material.

In other experiments, the amounts of O-(2,4,5-trichlorophenyl) phosphorodichloridite, phosphorus trichloride and sulfur employed above were kept the same as before and the amount of O-(2,4,5-trichlorophenyl) phosphorodichloridothioate varied under the same reaction conditions with the following results:

| Run No. | Moles of O-(2,4,5-Trichlorophenyl) Phosphorodichloridothioate Employed as Solvent | Percent Yield of O-(2,4,5-Trichlorophenyl) Phosphorodichloridothioate Based Upon the O-(2,4,5-Trichlorophenyl) Phosphorodichloridite Starting Material |
|---|---|---|
| A | None | 85.0 |
| B | 0.1 | 88.0 |
| C | 0.5 | 92.0 |
| D | 1.0 | 96.5 |
| E | 1.5 | 99.0 |

*Example 2.—O-(2-chloro-4-tertiarybutyl) phosphorodichloridothioate*

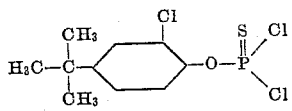

32 grams (one gram atom) of sulfur was added portionwise with stirring to a mixture containing 286 grams (1.0 mole) of O-(2-chloro-4-tertiarybutyl) phosphorodichloridite, 318 grams (1.0 mole) of O-(2-chloro-4-tertiarybutylphenyl) phosphorodichloridothioate and 69 grams (0.5 mole) of phosphorus trichloride. The addition was carried out over a period of two hours and at a temperature of from 160° to 175° C. at atmospheric pressure. Stirring was thereafter continued at the same temperature for an additional two hours. Upon completion of the reaction, the reaction mixture was fractionally distilled under reduced pressure to obtain 622 grams of an O-(2-chloro-4-tertiarybutylphenl) phosphorodichloridothioate product as a clear, viscous liquid boiling at 175°–177° C. at 10 millimeters pressure. The actual yield was 304 grams or 95.8 percent based upon the phosphorodichloridite starting material.

The reaction of phosphorus trichloride, sulfur and other phosphorodichloridites including O-(2-chlorophenyl) phosphorodichloridite, O-(2-bromophenyl) phosphorodichloridite, O-(2,4-dichlorophenyl) phosphorodichloridite, O-(2,4-dibromophenyl) phosphorodichloridite, O-(2,5-dichlorophenyl) phosphorodichloridite, O-(2,5-dibromophenyl) phosphorodichloridite, O-(2,6-dichlorophenyl) phosphorodichloridite, O-(2-chloro-4-methylphenyl) phosphorodichloridite, O-(2-bromo-4-ethylphenyl) phosphorodichloridite and O-(2-chloro-4-isopropylphenyl) phosphorodichloridite, in the presence of the corresponding phosphorodichloridothioate, in the manner described and illustrated gives the same improved and desirable yields of O-(2-chlorophenyl) phosphorodichloridothioate, O-(2-bromophenyl) phosphorodichloridothioate, O-(2,4-dichlorophenyl) phosphorodichloridothioate, O-(2,4-dibromophenyl) phosphorodichloridothioate, O-(2,5-dichlorophenyl) phosphorodichloridothioate, O-(2,5-dibromophenyl) phosphorodichloridothioate, O-(2,6-dichlorophenyl) phosphorodichloridothioate, O-(2-chloro-4-methylphenyl) phosphorodichloridothioate, O-(2-bromo-4-ethylphenyl) phosphorodichloridothioate, and O-(2-chloro-4-isopropylphenyl) phosphorodichloridothioate, respectively.

The O-(halophenyl) phosphorodichloridities and O-(2-halo-4-loweralkylphenyl) phosphorodichloridities employed as starting materials in the present invention may be prepared by reacting phosphorus trichloride with a substituted phenol in the presence of magnesium chloride as catalyst. The reaction takes place smoothly at the boiling temperature of the reaction mixture with the evolution of hydrogen chloride of reaction. Good results are obtained when employing at least seven moles of phosphorus trichloride with each mole of phenol. In carrying out the reaction, the phenol, catalyst and phosphorus trichloride are mixed together and heated at the boiling temperature. Upon completion of the reaction as evidenced by the cessation of hydrogen chloride evolution, the reaction mixture is distilled under reduced pressure to separate unreacted phosphorus trichloride and obtain the desired phosphorodichloridite as a liquid residue.

I claim:

1. A method for the manufacture of a phosphorodichloridothioate having the formula

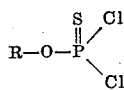

in which R represents a member of the group consisting of the mono-, di- and tri-chlorophenyl, mono-, di- and tri-bromophenyl, 2-chloro-4-loweralkylphenyl and 2-bromo-4-loweralkylphenyl radicals, which comprises reacting phosphorus trichloride, sulfur and a phosphorodichloridite of the formula

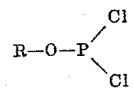

wherein R is as defined above, in the initial presence of at least 0.1 mole of the desired phosphorodichloridothioate for each mole of said dichloridite at a temperature of from 160° to 180° C.

2. A method for the manufacture of a phosphorodichloridothioate having the formula

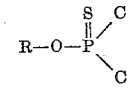

in which R represents a member of the group consisting of the mono-, di- and tri-chlorophenyl, mono-, di- and tri-bromophenyl, 2-chloro-4-loweralkylphenyl and 2-bromo-4-loweralkylphenyl radicals, which comprises reacting one molecular proportion of a phosphorodichloridite of the formula

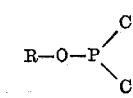

wherein R is as defined above, with sulfur in the presence of phosphorus trichloride, the amount of sulfur being at least one gram atom for each molecular proportion of the phosphorodichloridite but not in excess of one gram atomic proportion for each molecular proportion of total phosphorodichloridite and phosphorus trichloride employed, in the initial presence of from 0.5 to 1.5 molecular proportions of the desired phosphorodichloridothioate and at a temperature of from 160° to 180° C., the employed amount of phosphorus trichloride not exceeding 0.8 molecular proportion for each molecular proportion of phosphorodichloridite.

3. A method for the manufacture of O-(2,4,5-trichlorophenyl) phosphorodichloridothioate which comprises reacting at a temperature of from 160° to 180° C. a mixture of one molecular proportion of O-(2,4,5-trichlorophenyl) phosphorodichloridite, 0.5 molecular proportion of phosphorus trichloride and at least one gram atom of sulfur in the initial presence of from 0.5 to 1.5 molecular proportions of O-(2,4,5-trichlorophenyl) phosphorodichloridothoate.

4. A method for the manufacture of O-(2-chloro-4-tertiarybutylphenyl) phosphorodichloridothioate which comprises reacting at a temperature of from 160° to 180° C. a mixture of one molecular proportion of O-(2-chloro-4-tertiarybutylphenyl) phosphorodichloridite, 0.5 molecular proportion of phosphorus trichloride and at least one gram atom of sulfur in the initial presence of from 0.5 to 1.5 molecular proportions of O-(2-chloro-4-tertiarybutylphenyl) phosphorodichloridothioate.

References Cited in the file of this patent

Mellor: Comprehensive Treatise on Inorganic and Theoretical Chemistry, vol. 8, page 1074 (1928), Longmans Green & Co., New York.

Gottlieb: J. Am. Chem. Soc., 54, 748–50 (1932).

Kosolapoff: Organo-Phosphorus Compounds, page 215 (1950 ed.), John Wiley & Sons, New York.